United States Patent
Herbig

(10) Patent No.: US 7,068,990 B1
(45) Date of Patent: Jun. 27, 2006

(54) RECEIVER FOR TWO ORTHOGONALLY POLARIZED SIGNALS

(75) Inventor: Gerhard Herbig, Oppenweiler (DE)

(73) Assignee: Marconi Communications GmbH, Backnang (DE)

( * ) Notice: Subject to any disclaimer, the term of this patent is extended or adjusted under 35 U.S.C. 154(b) by 0 days.

(21) Appl. No.: 10/009,619

(22) PCT Filed: Jun. 8, 2000

(86) PCT No.: PCT/IB00/00806

§ 371 (c)(1),
(2), (4) Date: May 6, 2003

(87) PCT Pub. No.: WO00/77952

PCT Pub. Date: Dec. 21, 2000

(30) Foreign Application Priority Data

Jun. 11, 1999 (DE) .................. 199 26 658

(51) Int. Cl.
*H04B 1/10* (2006.01)

(52) U.S. Cl. .............. 455/295; 455/303; 455/136; 329/316; 375/349; 375/351

(58) Field of Classification Search ........... 455/295, 455/296, 303, 305, 132, 136; 329/316, 318, 329/320; 375/346, 348, 349, 351
See application file for complete search history.

(56) References Cited

U.S. PATENT DOCUMENTS

| | | | | |
|---|---|---|---|---|
| 4,757,319 A | * | 7/1988 | Lankl | .................. 342/378 |
| 4,910,468 A | * | 3/1990 | Ohtsuka et al. | ............. 329/316 |
| 4,914,676 A | * | 4/1990 | Iwamatsu et al. | ........... 375/349 |
| 4,992,798 A | * | 2/1991 | Nozue et al. | ................ 342/362 |
| 5,075,697 A | * | 12/1991 | Koizumi et al. | ............. 342/361 |
| 5,383,224 A | * | 1/1995 | Mizoguchi | ................... 375/346 |
| 5,710,799 A | | 1/1998 | Kobayashi | |
| 5,852,629 A | | 12/1998 | Iwamatsu | |
| 6,545,728 B1 | * | 4/2003 | Patel et al. | .................. 348/725 |

FOREIGN PATENT DOCUMENTS

EP 0 418 781 A2 3/1991

OTHER PUBLICATIONS

*Hardware Realization of An XPIC System/Measurement Method and Results*, European Conference on Radio Relay Systems, GB, London, IEE, Bd, Conf. 4, Oct. 11, 1993, M. Biester, et al., Seiten 255-260.

* cited by examiner

*Primary Examiner*—Edward F. Urban
*Assistant Examiner*—Blane Jackson
(74) *Attorney, Agent, or Firm*—Kirschstein, et al.

(57) ABSTRACT

The inventive receiver has a receiving branch for each of the two signals (EH, EV) and a demodulator (MHE, MVE) and means (SH, SV) for synchronising the phase of the received signal (EH, EV) with the transmitting phase are provided in said branches, respectively. Polaristion decouplers (XPIC-VH, XPIC-HV) which compensate cross-polar crosstalk between the two received signals (EH, EV) are provided for both of the receiving branches. The polarisation decoupling (XPIC-VH, XPIC-HV) of the two received signals (EH, EV) takes place after they have been demodulated (MHE, MVE) and before they have been phase-synchronised (SH, SV) so that the receiver can function as inexpensively as possible in terms of the components that it requires and so that it can also compensate cross polar channel crosstalk for circular QAM signal constellations.

3 Claims, 2 Drawing Sheets

RECEIVER FOR TWO ORTHOGONALLY POLARIZED SIGNALS

PRIOR ART

The present invention concerns a receiver for two orthogonally polarized signals with the same carrier frequency, a receiving branch being present for each of the two signals, each of which has a demodulator and means for synchronization of the phase of the received signals to the transmitted phase and in which polarization decouplers are present for both receiving branches that compensate for cross-polar crosstalk between the two received signals.

In order to be able to better utilize the available channel frequencies in directional radio, two transmitted signals are modulated with the same carrier frequency. In order for these two signals not to interfere with each other, linearly polarized radio waves that are perpendicular to each other are used in the transmitter for the two signals. However, depolarization effects occur within the radio transmission channel. The causes for this are nonhomogeneous air layers that generate echos that are additionally rotated in the polarization plane. The two received signals received by the receiver therefore exhibit not only a copolar signal fraction, but also a cross-polar signal fraction. The copolar signal fraction is the useful signal with the undistorted polarization. The cross-polar signal fraction is a crosstalk signal that originates from the depolarization effect of the transmitted signal emitted at the other polarization and is superimposed on the copolar signal fraction.

In order to compensate for channel crosstalk occurring on the transmission channel, appropriate measures must be taken in the receiver. So-called polarization decouplers are used for this purpose, as is known, which are referred to in English as cross-polarization interference cancellers or XPIC for short. A receiver of the type just mentioned is described in M. Biester et al.: Hardware Realization on an XPIC System/Measurement Method and Results, Radio Relay Systems, Oct. 11–14, 1993, Conference Publication No. 386, pp. 255–260, which compensates for cross-polar crosstalk in the individual receiving branches by means of polarization decouplers. This known receiver is shown in FIG. 2.

Figure 2:
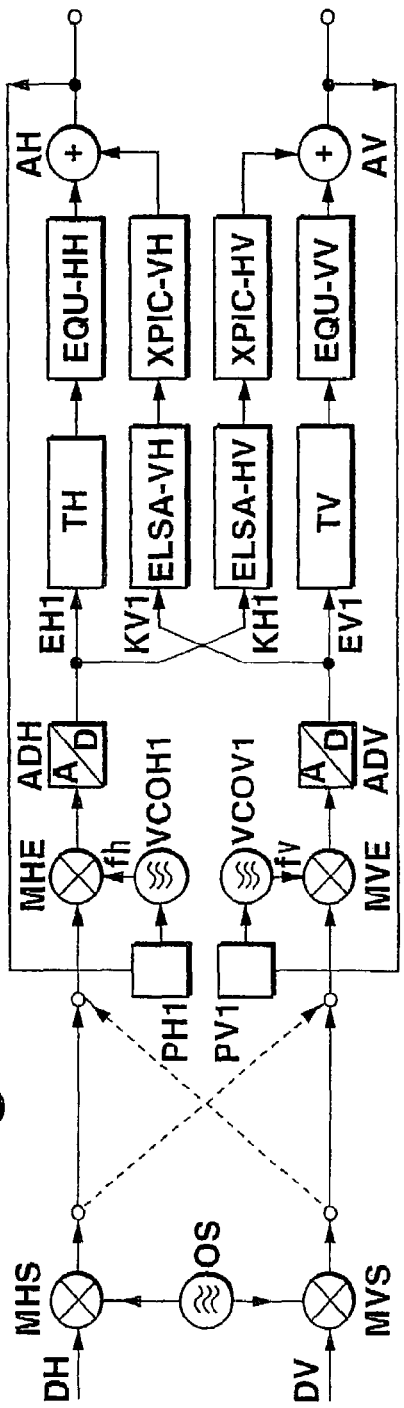

The left part of FIG. 2 shows that two transmitted signals are generated with the same carrier frequency, which are transmitted orthogonally polarized to each other via a transmission channel to a receiver. The horizontally polarized transmitted signal is produced by modulation of a carrier signal made available an oscillator OS with data DH in a modulator MHS and the vertically polarized transmitted signal is produced by modulation on the same carrier signal with data DV in a modulator MVS. The transmission channel is indicated by four dashed arrows. The horizontally running arrows mark the copolar signal fractions of the horizontally polarized transmitted signal and the vertically polarized transmitted signal. The crossed dashed arrows symbolize the cross-polar crosstalk of the two transmitted signals.

The receiver following on the end of the transmission channel has two receiving branches, in which the horizontally polarized received signal is fed to one receiving branch and the vertically polarized received signal to the other receiving branch. The polarization separation of the received signals and the corresponding division to the two receiving branches occurs in an antenna with two receiving elements rotated relative to each other, which are not shown here. Initially the received signals are demodulated in the two receiving branches. For this purpose, a mixer MHE is situated in the receiving branch for the horizontally polarized received signal, which is driven with a reference frequency fh delivered by a voltage-controlled oscillator VCOH1. The demodulator not only converts the received signal in the baseband, but also carries out synchronization of the phase of the received signal carrier to the transmitted signal carrier. The phase synchronization is symbolized by a block PH1, which receives the output signal of the receiving branch as output quantity. This phase synchronization is not taken up further here, since it can be carried out according to the prior art, for example, by means of a phase control loop, and is not the object of the invention. In the other receiving branch for the vertical received signal, the same such demodulation is carried out, including phase synchronization. For this purpose, a mixer MVE is present in the receiving branch for the vertically polarized received signal, which receives a reference frequency fv from the voltage-controlled oscillator VCOV1. A block PV1 symbolizes the synchronization of the vertically polarized received signal to the transmitted signal phase.

The received signals reduced after demodulation in the two receiving branches in the baseband are then fed to an analog/digital converter ADH, ADV, so that further processing of the received signals can be continued by means of digital filters.

The horizontally polarized received signal EH1 is then fed after the analog/digital converter ADH to a delay element TH and an equalizer EQU-HH, which compensates for echos in the received signal that develop due to multipath propagation in the transmission channel. In the same manner, the vertically polarized received signal EV1 after the analog-digital converter ADV is fed to a delay element TV and an equalizer EQU-VV. Part of the horizontally polarized received signal EH1 is tapped in a first signal branch between the analog-digital converter ADH and the delay element TH. This compensation signal KH1 is fed to an elastic memory ELSA-HV and a subsequent cross-polarization decoupler XPIC-HV and then superimposed by means of an adder AV on the delayed TV and equalized EQU-VV vertically polarized received signal EV1.

The two elastic memories ELSA-VH and ELSA-HV and also the delay elements TH and TV are used to adjust the different timings in the two receiving branches to each other. Only if complete timing synchronicity is present in the two receiving branches is the compensation signal KV1 derived from the vertical receiving path capable of compensating for the cross-polar crosstalk in the horizontal receiving branch, and the compensation signal KH1 derived from the horizontal receiving branch is then capable of compensating for the cross-polar crosstalk in the vertical receiving branch. The cross-polarization decouplers XPIC-VH and XPIC-HV are digital filters with adaptive adjustment of the filter coefficient, like the equalizers EQU-HH and EQU-VV. Compensation of the crosstalk signal fractions in the individual receiving branches depends on the adjustment of the filter coefficients. Adaptive adjustment of the filter coefficients is already part of the prior art and is described, for example, in EP 0 418 781 B1.

In the known methods just described from the already cited literature source, the polarization decouplers XPIC-VH and XPIC-HV are not capable of compensating for the cross-polar crosstalk in the two receiving branches as long as the carrier controls are still not locked into the two receiving branches. For optimal extinction of channel crosstalk, the compensation signals KV1 and KH1 must precisely exhibit the same properties as the crosstalk signal fractions in the receiving branches, in particular, the corresponding compensation signal KV1 or KH1 must be demodulated with the same frequency as the crosstalk signal fraction in the received signal VH1 and EV1. Since channel crosstalk is demodulated in the horizontal and vertical receiving branch, but the compensation signal KV1 or KH1 is demodulated in the vertical or horizontal receiving branch, the mentioned prerequisite of frequency equality is only met when the carrier frequencies are identical in the two receiving branches. This is also fulfilled after all transient processes, but not at the beginning of transmission or after failure of the system. The self-synchronization expected of directional radios is therefore not guaranteed in each case with the strongest channel distortions in the previously described known arrangement. The described arrangement is only suitable for compensating for channel crosstalk in each transmission phase for those modulation methods that can contribute to particularly robust carrier phase synchronization by directed measures. One of these measures is described, for example, in DE 41 00 099 C1. The arrangement for carrier recovery described in this document, however, only functions for quadratic QAM signal constellations (16-, 64-, 256-QAM). An appropriate corresponding measure for round or so-called cross-QAM signal constellations (36-, 128-QAM) is not known.

Figure 3:
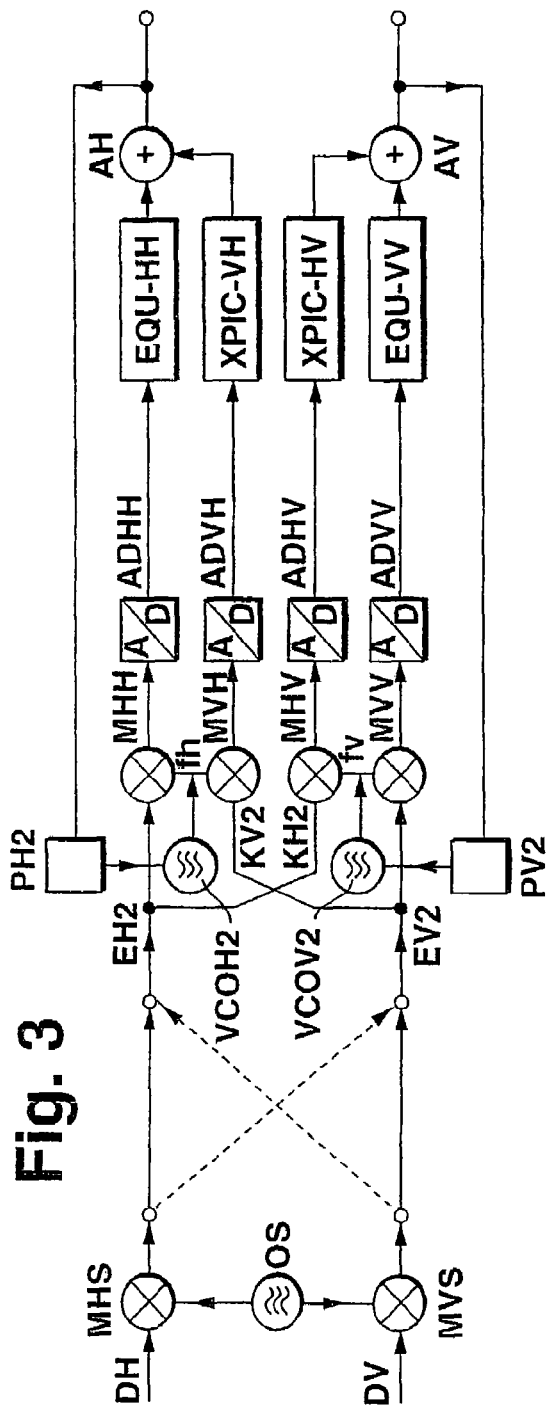

In the two receiving branches of a receiver for two orthogonally polarized signals with the same carrier frequency, the same carrier frequencies fh and fv are indeed used, but the two demodulation oscillators (VCOH1, VCOV1 in FIG. 2) must not be rigidly coupled to each other any which way, since different received signal phases are produced by the different propagation conditions and the demodulators require corresponding degrees of freedom. For this reason, a different receiver concept is used for compensation of cross-polar crosstalk for round QAM signal constellations, for example, 128-QAM, as shown in FIG. 3 and known from R. Schmidmaier et al.: A New Cochannel Radio System for 28/30 MHz Frequency Spacings Based on a Narrow-Band RF Branching Concept, ECRR 5, May 14–17, 1996, pp. 232–237.

In this known 128-QAM receiver depicted in FIG. 3, a compensation signal KH2 is decoupled from the horizontally polarized received signal EH2 and a compensation signal KV2 is decoupled from the vertically polarized received signal EV2 before demodulation of the received signal. It is therefore possible to demodulate the horizontally polarized received signal EH2 together with the compensation signal KV2 coordinated with it with the same oscillator frequency fh and likewise the vertically polarized received signal EV2 with its corresponding compensation signal KH2 with the same oscillator frequency fv. An appropriate mixer is therefore available for each of the signals EH2, KV2, EV2, KH2, namely the mixer MHH for signal EH2, the mixer MVH for signal KV2, the mixer MVV for signal EV2 and mixer MHV for signal KH2. The two mixers MHH and MVH for the received signal EH2 and the compensation signal KV2 receive the same reference frequency fh from a voltage-controlled oscillator VCOH2. The mixers MVV and MHV for the received signal EV2 and the compensation signal KH2 receive the same reference frequency fv from the voltage controlled oscillator VCOV2.

In addition to conversion into the base bands for the mentioned four signals, synchronization of the phase of the received signals to the transmitted phase also simultaneously occurs in the demodulators. As already described in conjunction with FIG. 2, in the receiver depicted in FIG. 3, phase synchronization devices indicated by the two blocks PH2 and PV2 are also provided, which receive as output values the output signals of the two receiving branches and deliver a manipulated variable for the two voltage controlled oscillators VCOH2 and VCOV2. For each of the four signals reduced into the baseband, their own analog/digital converters ADHH, ADVH, ADVV and ADHV are present.

After the described demodulation and in conjunction with analog/digital conversion, the horizontally polarized received signal is fed to an equalizer EQU-HH, the corresponding compensation signal KV2 to a cross-polarization equalizer XPIC-HV, the vertically polarized received signal EV2 to an equalizer EQU-VV and the corresponding compensation signal KH2 to a cross-polarization decoupler XPIC-HV. The function of equalizers EQU-HH, EQU-VV and the cross-polarization equalizers XPIC-VH, XPIC-HV corresponds to the components with the same names in the already described FIG. 2.

In the receiver concept depicted in FIG. 3, twice as many mixers and analog/digital converters are required as in the receiver concept depicted in FIG. 2.

The underlying task of the invention is to offer a receiver of the type just mentioned that is capable with the least possible circuit expense to also compensate for cross-polar channel crosstalk in received signals with round QAM signal constellations.

ADVANTAGES OF THE INVENTION

The mentioned task is solved with the features of claim 1 in that polarization decoupling of the two received signal occurs after their demodulation and before their phase synchronization. Only one demodulator is therefore required for each receiving branch and both demodulators can be driven with the same reference frequency, so that no difference modulation can occur between the two receiving branches. This is the prerequisite for a situation in which no acquisition problems are produced for the cross-polarization decoupler and the cross-polarization decoupling is already fully capable at the beginning of transmission or after an interruption. The receiver according to the invention therefore combines the advantage of a small number of components of the known receiver depicted in FIG. 2 and the advantage of the known receiver depicted in FIG. 3, which guarantees adaptation of the cross-polarization decoupler in all operating states.

According to subclaims, it is expedient to drive the demodulators in both receiving branches with the same reference frequency delivered either from a free-wheeling oscillator or an oscillator controlled by automatic frequency control.

DRAWING

Figure 1:
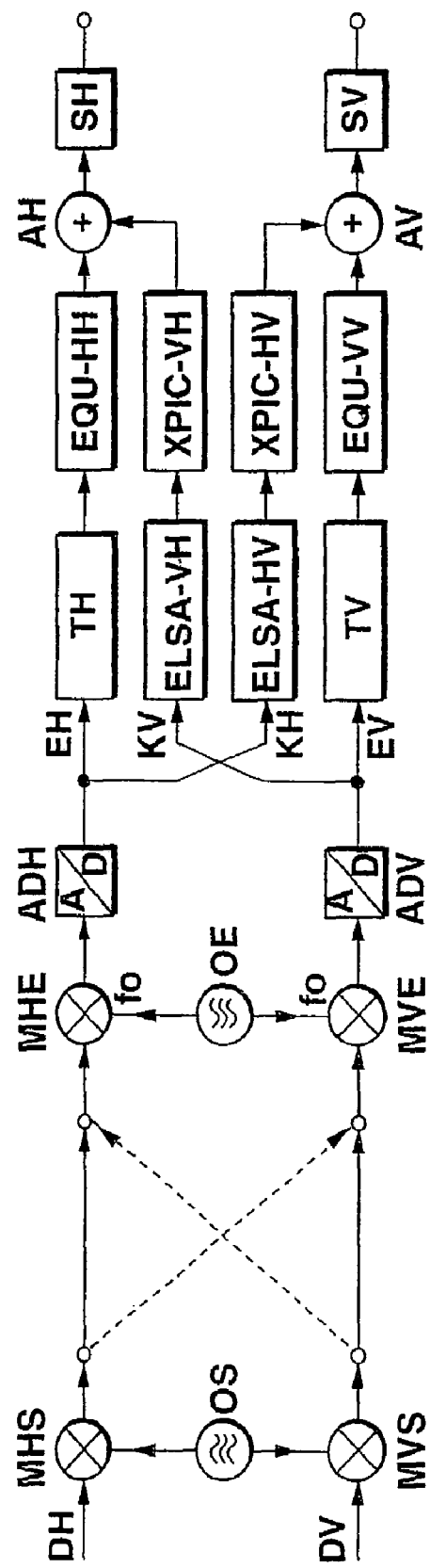

The invention is now explained further with reference to a practical example depicted in the drawing. In the drawing:

FIG. 1 shows a receiver for two orthogonally polarized signals with the same carrier frequency according to the invention, FIG. 2 shows a first receiver according to the prior art and FIG. 3 shows a second receiver according to the prior art.

DESCRIPTION OF THE PRACTICAL EXAMPLE

The circuits depicted in FIGS. 2 and 3 were already described in the introduction to the description, since they belong to the prior art. In the circuit arrangement depicted in FIG. 1, components with the same reference numbers have the same functions as those in FIGS. 2 and 3 in conjunction with these figures.

On the left side of the circuit depicted in FIG. 1, a transmitter for two orthogonally polarized signals with the same carrier frequency is shown. In this case, data DH for the horizontally polarized channel are modulated with a mixer MHS onto a carrier signal delivered from an oscillator OS. Data DV for the vertical channel are modulated onto the same carrier signal with a mixer MVS. The transmission channel and the cross-polar crosstalk that develops in it between the channels is indicated by the dashed arrows.

A demodulator consisting of a mixer MHE (in the horizontally polarized receiving branch) and mixer MVE (in the vertically polarized receiving branch) are situated in the two receiving branches. Both mixers are driven with the same reference frequency f0 delivered by a free-wheeling oscillator OE. Instead of a free-wheeling oscillator, an oscillator controlled by an automatic frequency control (AFC) can also be used. After demodulation, the received signals in both receiving branches are subjected to analog/digital conversion ADH, ADV. After this analog/digital conversion, a compensation signal KH is branched off from the horizontally polarized received signal EH and a compensation signal KV from the vertically polarized received signal EV. As already stated in the description concerning FIG. 1, the horizontally polarized received signal EH and the vertically polarized received signal EV are both fed to a delay element TH, TV and a subsequent equalizer EQU-HH, EQU-VV. The two compensation signals KV and KH each pass through an elastic memory ELSA-VH, ELSA-HV and a subsequent cross-polarization decoupler XPIC-VH, XPIC-HV. After the horizontally polarized signal EH has passed through the delay element TH and equalizer EQU-HH and the corresponding compensation signal KV is passed through the elastic memory ELSA-VH and a cross-polarization equalizer XPIC-VH, they are superimposed on each other by an adder AH. The vertically polarized received signal EV, after it is passed through the delay element TV and the equalizer EQU-VV, and the corresponding compensation signal KH, after it is passed through the elastic memory ELSA-HV and the cross-polarization coupler XPIC-HV, are likewise superimposed on each other by adder AV. If, as already outlined in the introduction, the coefficients of the individual equalizers EQU-HH, EQU-VV and the cross-polarization decouplers XPIC-VH, XPIC-HV designed as digital filters are optimally adjusted, the crosstalk signal fractions in the received signal EH and EV are fully compensated.

In conjunction with cross-polarization decoupling of the horizontally polarized received signal EH and the vertically polarized received signal EV, synchronization of the phases of these two received signals to the transmitted phase occurs. For this purpose, a component SH, SV for phase synchronization is present in each receiving branch, consisting of a phase rotation element controlled by a known phase control loop (PLL).

By separation of the actual demodulation process from the phase synchronization, a situation is achieved in which different frequency positions of the crosstalk signal fraction can never occur in the received signal EH and EV and the corresponding compensation signals KV and KH. Whereas in conventional demodulators, as shown in FIGS. 2 and 3, the phase position of the receiving oscillator is adjusted within a phase control loop precisely synchronously to the phase position of the transmitter oscillator and a phase synchronicity of the demodulated baseband signals relative to the transmitted signal is therefore present, in the circuit according to FIG. 1 the demodulation process and the synchronization process are carried out in different components. The demodulated received signals are then also baseband signal, but they can also still have errors with reference to center frequency relative to the transmitted signals. The residual frequency and phase errors are removed in the subsequent synchronization components SH and SV. The described circuit makes it possible to demodulate the received signals in both receiving branches with identical frequency, but to synchronize to different phases. The crosstalk signal fractions in the received signal EH, EV and the corresponding compensation signals KV and KH have the same frequency position, so that adaptation of the cross-polarization decoupler XPIC-VH and XPIC-HV is guaranteed in all operating states of the receiver, and the two receiving branches are nevertheless fully independent of each other in their phase position. Only by the new concept of joint demodulation of the two received signals EH and EV and phase synchronization separated from it, is reliable cross-polarization decoupling made possible for nonquadratic QAM signal constellations (for example, 128-QAM) in XPIC structures with baseband decoupling of the compensation signals.

The invention claimed is:

1. A receiver for receiving two orthogonally polarized received signals having phases and a same carrier frequency, comprising: receiving branches for the received signals; demodulators for demodulating the received signals; means for independently synchronizing the phases of the received signals to a phase of a transmitted signal; and polarization decouplers for both receiving branches for compensating for cross-polar crosstalk between the received signals, and for polarization decoupling the received signals after their demodulation by the demodulators and before their phase synchronization by the synchronizing means.

2. The receiver according to claim 1, wherein the demodulators in both receiving branches are driven with the same reference frequency delivered by a free-wheeling oscillator.

3. The receiver according to claim 1, wherein the demodulators in both receiving branches are driven with the same reference frequency delivered by an automatic frequency control of a controlled oscillator.

* * * * *